United States Patent
Korinek et al.

(10) Patent No.: US 6,181,929 B1
(45) Date of Patent: Jan. 30, 2001

(54) METHOD FOR SWITCHING CELL SITE CONTROLLERS

(75) Inventors: Frank W. Korinek, Carol Stream; Jeffrey J. Blanchette, Palatine; Michael J. Batz, Schaumburg, all of IL (US)

(73) Assignee: Motorola, Inc., Schaumburg, IL (US)

( * ) Notice: Under 35 U.S.C. 154(b), the term of this patent shall be extended for 0 days.

(21) Appl. No.: 08/858,137

(22) Filed: May 19, 1997

Related U.S. Application Data

(60) Provisional application No. 60/017,986, filed on May 20, 1996.

(51) Int. Cl.$^7$ ............................... H04Q 7/20; H04B 1/60
(52) U.S. Cl. ................................... 455/423; 455/8; 455/9
(58) Field of Search .......................... 455/81, 423, 428, 455/424, 418, 420, 9, 11.1, 8; 395/182.08; 370/219, 220; 379/279, 111–134; 714/4, 13; 318/565, 563, 564

(56) References Cited

U.S. PATENT DOCUMENTS

| | | | |
|---|---|---|---|
| 3,593,302 | * 7/1971 | Saito et al. ............................ 710/37 |
| 3,792,448 | * 2/1974 | Bennett et al. .......................... 714/5 |
| 3,964,056 | * 6/1976 | C harpentier et al. ................ 714/10 |
| 4,010,450 | * 3/1977 | Porter et al. ............................ 714/5 |
| 4,141,066 | * 2/1979 | Keiles ................................... 364/186 |
| 4,351,023 | * 9/1982 | Richer ................................... 364/187 |
| 4,521,871 | * 6/1985 | Galdun et al. ........................ 714/11 |
| 4,634,110 | * 1/1987 | Julich et al. .......................... 714/11 |
| 4,684,885 | * 8/1987 | Chapman et al. .................... 371/24 |
| 4,811,388 | * 3/1989 | Westerhof et al. ................... 379/229 |
| 4,881,227 | * 11/1989 | Buhren .................................. 714/11 |
| 4,958,270 | * 9/1990 | McLaughlin et al. ............... 364/187 |
| 5,014,261 | * 5/1991 | Shinbashi et al. ................... 370/220 |
| 5,136,498 | * 8/1992 | McLaughlin et al. ............... 364/184 |
| 5,155,678 | * 10/1992 | Fukumoto et al. .................. 707/202 |
| 5,175,866 | * 12/1992 | Childress et al. ..................... 455/8 |
| 5,185,779 | * 2/1993 | Dop et al. .............................. 379/33 |
| 5,212,804 | * 5/1993 | Choate ................................. 455/431 |
| 5,274,838 | * 12/1993 | Childress et al. ..................... 455/9 |
| 5,289,179 | * 2/1994 | Beeson, Jr. et al. ................. 340/826 |
| 5,303,243 | * 4/1994 | Anezaki ................................. 714/13 |
| 5,313,386 | * 5/1994 | Cook et al. .......................... 364/187 |
| 5,323,144 | * 6/1994 | Imai et al. ...................... 340/825.01 |
| 5,365,512 | * 11/1994 | Combs et al. ........................ 370/341 |
| 5,437,059 | * 7/1995 | Murakami et al. .................. 455/503 |
| 5,448,766 | * 9/1995 | Sanning et al. ...................... 455/103 |
| 5,454,025 | * 9/1995 | Mulrow et al. ....................... 379/45 |
| 5,530,921 | * 6/1996 | Dulong et al. ....................... 455/120 |
| 5,535,191 | * 7/1996 | Park ..................................... 370/228 |
| 5,546,452 | * 8/1996 | Andrews et al. .................... 379/219 |
| 5,551,056 | * 8/1996 | Koponen et al. ....................... 455/8 |
| 5,625,866 | * 4/1997 | Lidbrink et al. ........................ 455/8 |
| 5,649,089 | * 7/1997 | Kilner .................................... 714/6 |
| 5,666,646 | * 9/1997 | McCollum et al. .................... 455/8 |
| 5,684,794 | * 11/1997 | Lopez et al. ......................... 370/337 |
| 5,689,801 | * 11/1997 | Frichtel et al. ........................ 455/9 |
| 5,923,643 | * 7/1999 | Higgins et al. ...................... 370/218 |
| 5,966,304 | * 10/1999 | Cook et al. .......................... 364/187 |

OTHER PUBLICATIONS

Hagstrom et al., "RBS 884 A New Generation Radio Base Stations for American Standard" Ericsson Review, pp. 4–13, 1994.*

* cited by examiner

*Primary Examiner*—Reinhard J. Eisenzopf
*Assistant Examiner*—Charles N. Appiah
(74) *Attorney, Agent, or Firm*—Wayne J. Egan; Steven A. May; Jeffrey K. Jacobs

(57) ABSTRACT

A radio frequency communication system includes a cell site (FIG. 1), the cell site including an on-line controller (100), an off-line controller (101) and one or more peripheral units (107, 108, 110, 112, 114) arranged to support the on-line controller. The cell site is arranged to switch from the on-line controller to the off-line controller based upon a failure of the on-line controller or a failure of any peripheral unit of the one or more peripheral units arranged to support the on-line controller.

6 Claims, 2 Drawing Sheets

METHOD FOR SWITCHING CELL SITE CONTROLLERS

REFERENCE TO PRIOR PROVISIONAL APPLICATION

The applicant hereby claims the priority benefit of prior provisional application serial No. 60/017,986, filed May 20, 1996, by Frank W. Korinek, Jeffrey J. Blanchette and Michael Batz, the same inventors as in the present application, and which prior provisional application is hereby incorporated by reference verbatim, with the same effect as though the prior provisional application were fully and completely set forth herein.

FIELD OF THE INVENTION

This application relates to radio frequency ("RF") communication system cell sites with redundant controllers including, but not limited to, a method for switching cell site controllers.

BACKGROUND OF THE INVENTION

Modern radio frequency ("RF") communication systems such as, for example, the "iDEN" system which is commerciallly available from Motorola, Inc. of Schaumburg, Ill., have one or more cells. As is known, each cell is served by a corresponding cell site, with each cell site being controlled by a controller unit. In high-performance systems, each cell site contains redundant controllers. With this arrangement, one controller is on-line (the "on-line controller"), while the other controller is off-line (the "off-line controller"). If the on-line controller fails, the off-line controller is arranged to take over control of the cell site.

In the past, each of the multiple controllers was coupled to the RF system backbone by means of a dedicated link such as, for example, a T1 link. Obviously, for multiple controllers, this arrangement requires multiple links for each cell site. One problem with this arrangement, of course, is the cost of the multiple links.

To remedy the problem of the multiple links, in the past a single link has been provided to the cell site, with the single link being split into two (2) parallel branches, each branch then being coupled to one of the two controllers. Further, as above, the controllers were programmed with a software algorithm so that, when the on-line controller failed, it would "pass off" control to the off-line controller. The off-line controller would then take over and operate the cell site.

It is known that a cell site controller typically includes one or more peripheral units arranged to support the controller. Accordingly, the proper functioning of a cell site depends not only on the proper functioning of the cell site's on-line controller but also on the proper functioning of the one or more peripheral units arranged to support the cell site's on-line controller.

One problem with the prior switching method was that it switched the cell site from the on-line controller to the off-line controller based solely on whether the on-line controller itself failed, and without regard to the status of any peripheral units arranged to support the on-line controller. This problem is illustrated below.

One example of a peripheral unit that is typically arranged to support an on-line controller is a time frequency reference ("TFR") unit. It is known that an on-line controller can continue to operate for some time after the failure of its time frequency reference unit. As a result of the prior switching method, therefore, the on-line controller would continue to control the cell site even though its time frequency reference has failed. In this case, the cell site's timing ultimately will drift, then fail, probably within 30–40 minutes, thus bringing down the entire cell site.

In the foregoing example it must be appreciated that whilst the on-line controller continues to operate with its failed time frequency reference, at all times there remain available for use the off-line controller with its corresponding good time frequency reference. However, since the prior switching method was based solely on the failure of the on-line controller itself and without regard to the status of the on-line controller's supporting peripheral units, the cell site was deprived of the opportunity to switch to the off-line controller in a timely manner.

In summary, there is a need for an improved method for switching cell site controllers.

DESCRIPTION OF THE PREFERRED EMBODIMENT

Briefly, in a cell site of a radio frequency communication system, the cell site including an on-line controller, an off-line controller, and including one or more peripheral units arranged to support the on-line controller, there is disclosed a method of switching from the on-line controller to the off-line controller, the method comprising the steps of, first, detecting a failure of the on-line controller or a failure of at least one peripheral unit of the one or more peripheral units arranged to support the on-line controller and, second, based on detecting the failure of the on-line controller or the failure of at least one peripheral unit of the one or more peripheral units arranged to support the on-line controller, switching to the off-line controller.

Figure 1:
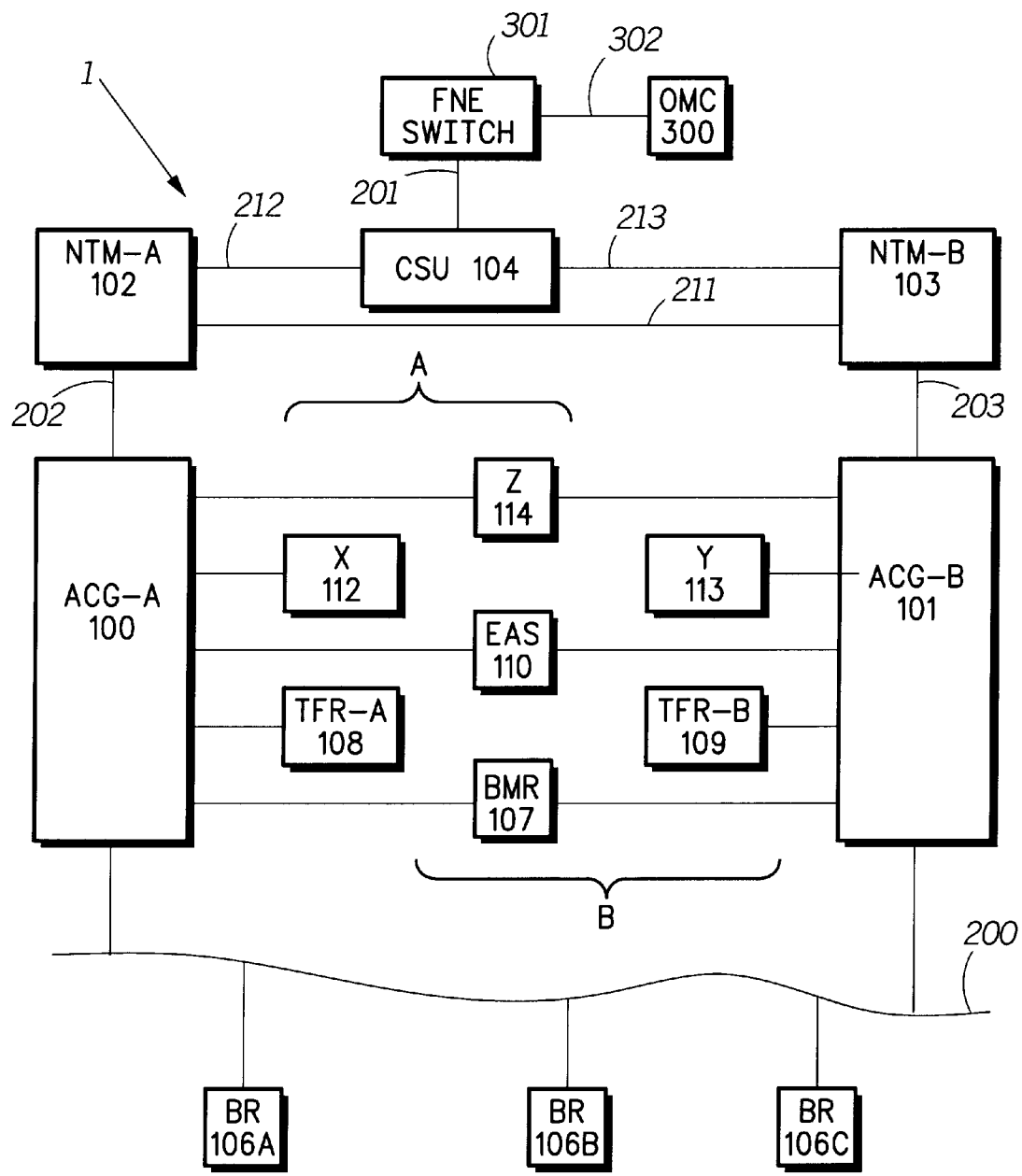
FIG. 1 depicts a typical cell site of a radio frequency communication system, the cell site being suitable for demonstrating the present invention.

Referring now to FIG. 1, there is shown a typical radio frequency communication system cell site 1 suitable for demonstrating the present invention. As shown, the cell site 1 is linked to the rest of the fixed network equipment 301 by means of a T1 link 201. Through switching by the fixed network equipment 301, the cell site 1 is connected to the operations and maintenance center 300 by means of an X.25 link 302. The cell site may comprise, for example, an iDEN system cell site. As discussed below, the cell site includes an on-line controller, an off-line controller, and includes one or more peripheral units arranged to support the on-line controller.

As shown, the cell site 1 includes two redundant cell site controllers, also known as "access controller gateway units," with the first access controller gateway unit designated "ACG-A," reference number 100, and the second access controller gateway unit designated "ACG-B," reference number 101. Also, these two redundant cell site controllers 100 and 101 are interconnected to a plurality of base radios 106A, 106B and 106C by means of an Ethernet link 200.

Still referring to FIG. 1, the first controller 100 is coupled to a first dedicated network transition module designated "NTM-A," reference number 102, by means of a first link 202. Likewise, the second controller 101 is coupled to a second dedicated network transition module designated "NTM-B," reference number 103, by means of a second link 203. In turn, the two network transition modules 102 and 103 couple the controller units 100 and 101 to the channel service unit ("CSU") 104 by means of a third link 212 and a fourth link 213. In turn, the channel service unit 104 is coupled to the fixed network equipment 301 by means of the T1 link 201. The modules 102 and 103 also negotiate control of the T1 link 201 by means of a shared synchronization link 211.

A first group of one or more peripheral units, collectively designated "A" in FIG. 1, is arranged to support the first controller 100. This first group of peripheral units includes a first time frequency reference unit designated "TFR-A," reference number 108, a base monitor radio designated "BMR," reference number 107, and an environmental alarm system designated "EAS," reference number 110. Since the present invention is applicable in situations where still further peripheral units are arranged to support the first controller 100, the first group of peripheral units is depicted as including other peripheral units designated "X," reference number 112, and "Z," reference number 114. It will be appreciated that peripheral units X and Z may comprise peripheral units now existing or created in the future. With respect to the first group of peripheral units, note the first time frequency reference unit 108 and the peripheral unit X are arranged to support the first controller 100 exclusively, while the base monitor radio 107, the environmental alarm system 110 and the peripheral unit Z are arranged to support both cell site controllers 100 and 101.

Also, a second group of one or more peripheral units, collectively designated "B" in FIG. 1, is arranged to support the second controller 101. This second group of peripheral units includes a second time frequency reference unit designated "TFR-B," reference number 109, and the base monitor radio 107 and the environmental alarm system 110. Since the present invention is applicable in situations where still further peripheral units are arranged to support the second controller 101, the second group of peripheral units is depicted as including the unit Z and a further peripheral unit designated "Y," reference number 113. It will be appreciated that peripheral unit designated Y may comprise any peripheral unit now existing or created in the future. With respect to the second group of peripheral units, note the second time frequency reference unit 109 and the peripheral unit Y are arranged to support the second controller 101 exclusively, while the base monitor radio 107, the environmental alarm system 110 and the peripheral unit Z are arranged to support both cell site controllers 100 and 101.

Figure 2:
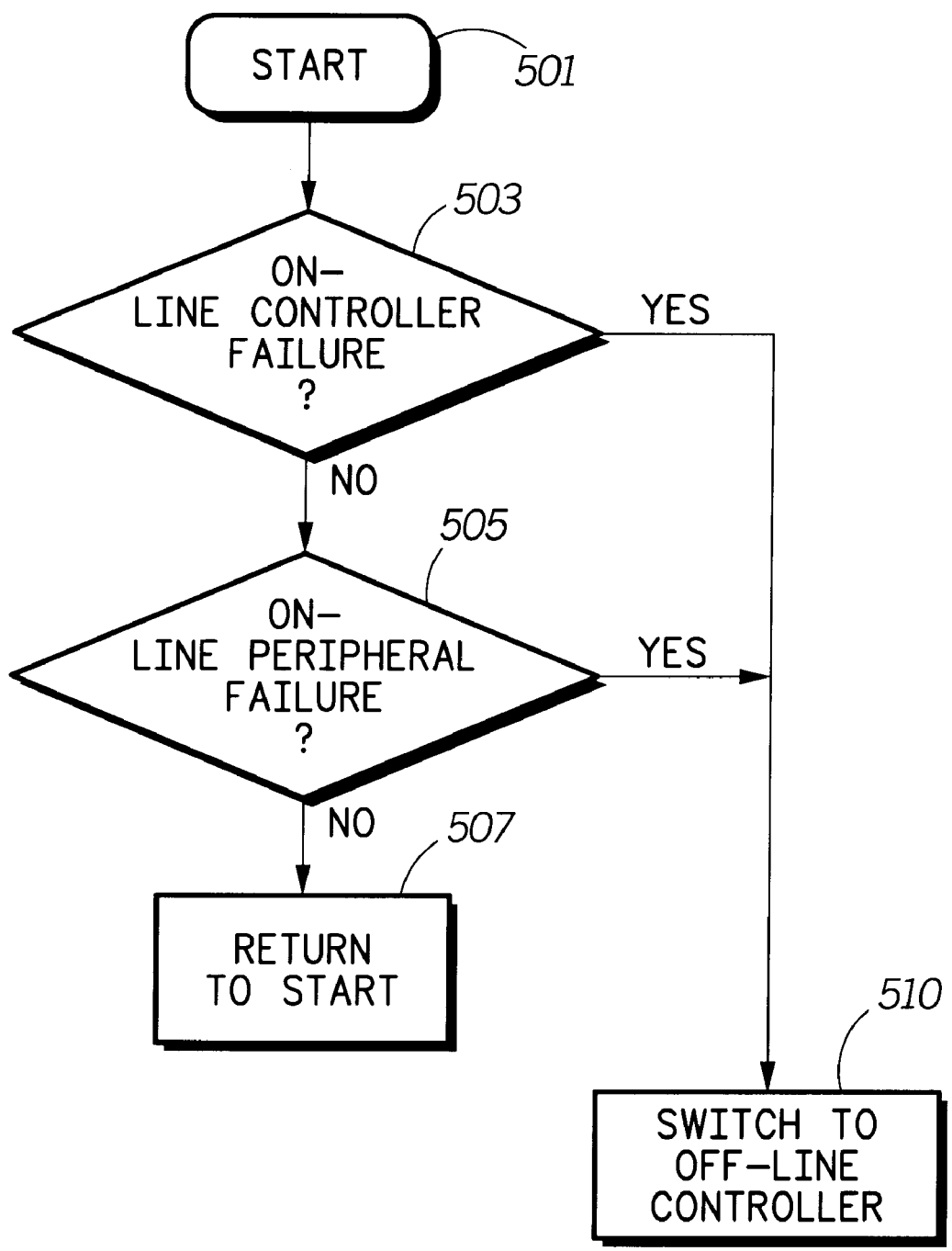
FIG. 2 is a flow diagram for a method for switching cell site controllers, in accordance with the present invention.

Referring now to FIG. 2, there is shown a flow diagram for a method of switching between the two redundant cell site controllers 100 and 101, that is, a method of switching from the on-line controller to the off-line controller. With momentary reference to FIG. 1, it will be appreciated that this method is performed by whichever controller—that is, either the first controller 100 or the second controller 101— is presently functioning as the cell site's on-line controller. In what follows, it will be assumed that the first controller 100 is functioning as the on-line cell site controller and that the second controller 101 is functioning as the off-line cell site controller.

The process starts, step 501, and then goes to step 503, where it determines when the on-line controller has failed. (Here the on-line cell site controller is assumed to be the first controller 100, and the off-line cell site controller is assumed to be the second controller 101.) When step 503 determines that the on-line controller has failed, the result is positive and the process goes to step 510. In step 510, the process switches the cell site to the off-line controller, here assumed to be the second controller 101.

Otherwise, when step 503 does not determine that the on-line controller has failed, the result is negative and the process goes to step 505.

In step 505, the process determines when a peripheral unit of the one or more peripheral units arranged to support the on-line controller has failed. As the on-line controller is the first controller 100, step 505 thus determines when a peripheral unit of the corresponding first group of peripheral units has failed, the first group of peripheral units comprising the first time frequency reference unit 108, the base monitor radio 107, the environmental alarm system 110, and the units X (112) and Z (114).

When step 505 determines that a peripheral unit of the one or more peripheral units arranged to support the on-line controller has failed, the result is positive and the process goes to step 510. In step 510, the process switches the cell site to the off-line controller, here assumed to be the second controller 101.

Otherwise, when step 505 does not determine that a peripheral unit of the one or more peripheral units arranged to support the on-line controller has failed, the result is negative and the process goes to step 507. In step 507, the process returns to start.

Accordingly, in a radio frequency communication system cell site 1 that includes an on-line controller 100, an off-line controller 101, and one or more peripheral units 107, 108, 110, 112 and 114 arranged to support the on-line controller, there has been disclosed a method of switching from the on-line controller to the off-line controller, the method comprising the steps of:

(a) determining (in step 503) when the on-line controller fails;

(b) when the on-line controller fails, switching (in step 510) to the off-line controller;

(c) determining (in step 505) when a peripheral unit of the one or more peripheral units fails; and, (d) when a peripheral unit of the one or more peripheral units fails, switching (in step 510) to the off-line controller.

Moreover, in the radio frequency communication system cell site 1, there has also been disclosed a method of switching from the on-line controller 100 to the off-line controller 101, the method comprising the steps of:

(a) detecting (in step 503) the failure of the on-line controller or (in step 505) the failure of at least one peripheral unit; and, (b) based on detecting the failure of the on-line controller or the failure of at least one peripheral unit, switching (in step 510) to the off-line controller.

The functional and/or structural differences between the present invention and previous methods are discussed below.

One unique aspect of the present invention is the swap of network manager and agent functions between the access controller gateway units when a redundancy switch occurs. In this invention the on-line controller performs the network manager function for the off-line controller and all other components of the cell site. Management messages between the off-line controller's agent and the system network manager are directed through the on-line controller. In contrast, prior controller-switching schemes support redundant controllers that act as peers.

Moreover, previous access controller gateway redundancy methods involved an automated version of simple redundancy in which the backup controller was able to take control of the system without manual intervention. No information regarding the system capabilities of the standby unit were involved. In contrast, the present invention uses state information from both the primary and the standby units to determine the viability of the two controllers in the system. In this manner, the system can operate in a degraded fashion, while still performing most of its operations.

Some results achieved by the present invention are discussed as follows. The present invention provides a cost-effective, controller redundancy solution for cell sites for which line costs are an issue.

Some advantages of the present invention over the prior method are discussed as follows. In the prior method, no system state or configuration information was saved during the control changeover. Further, this prior method was not in complete compliance with the site restart time required for our customers. It must be appreciated that loss of certain parts of the system does not necessarily imply that the system will not operate. In the previous method, this was not taken into account. In contrast, in the present invention, a degraded mode of operation is possible while still processing calls in the site until repairs can be made. Accordingly, system reliability and down time are both improved by the present invention.

While the foregoing example depicts a cell site (reference number 1 in FIG. 1) whose on-line controller (reference number 100 in FIG. 1) includes a plurality of peripheral units arranged to support the on-line controller, it will be understood that the present invention is equally applicable for a cell site having only one (1) peripheral unit arranged to support the cell site's on-line controller.

While various embodiments of a method for switching cell site controllers, in accordance with the present invention, have been described hereinabove, the scope of the invention is defined by the following claims.

What is claimed is:

1. In a cell site of a radio frequency communication system, the cell site including two redundant controllers, the two redundant controllers arranged so that at any point in time one controller of the two redundant controllers functions as an on-line controller, with the other controller of the two redundant controllers functioning as an off-line controller, and including one or more peripheral units arranged to support the on-line controller, a method of switching from the on-line controller to the off-line controller, the method comprising steps of:

(a) by the on-line controller, detecting a failure of at least one peripheral unit of the one or more peripheral units arranged to support the on-line controller; and (b) by the on-line controller, based on detecting the failure of at least one peripheral unit of the one or more peripheral units arranged to support the on-line controller, switching to the off-line controller;

wherein either controller of the two redundant controllers is able to function as the on-line controller.

2. The method of claim 1, where the on-line controller is an access controller gateway unit.

3. The method of claim 1, where the one or more peripheral units arranged to support the on-line controller includes a time frequency reference unit.

4. The method of claim 1, where the one or more peripheral units arranged to support the on-line controller includes a base monitor radio.

5. The method of claim 1, where the one or more peripheral units arranged to support the on-line controller includes an environmental alarm system.

6. The method of claim 1, the detecting step (a) including a step of determining the viability of the off-line controller based on the off-line controller's state information.

\* \* \* \* \*